United States Patent [19]

Dehling

[11] Patent Number: 5,346,742
[45] Date of Patent: Sep. 13, 1994

[54] SEALING TAPE FOR WRAPPING UP A CABLE EXTENDING THROUGH A CABLE PASSAGEWAY OPENING

[75] Inventor: Helmut Dehling, Dorsten, Fed. Rep. of Germany

[73] Assignee: Stewing Kunststoffbetrieb GmbH, Dorsten, Fed. Rep. of Germany

[21] Appl. No.: 968,094

[22] Filed: Oct. 29, 1992

[30] Foreign Application Priority Data

Oct. 29, 1991 [DE] Fed. Rep. of Germany ....... 4135570

[51] Int. Cl.$^5$ ............................................. C09J 7/02
[52] U.S. Cl. ........................................ 428/67; 428/78; 428/133; 428/138; 428/148; 428/172; 428/343
[58] Field of Search .................... 428/67, 78, 133, 138, 428/148, 172, 343

[56] References Cited

U.S. PATENT DOCUMENTS

| | | | |
|---|---|---|---|
| 2,732,065 | 1/1956 | Marchese | 428/78 |
| 2,822,509 | 2/1958 | Harvey | 428/148 |
| 3,205,972 | 9/1965 | Stricker | 428/78 |
| 4,512,833 | 4/1985 | Kridl | 428/133 |

*Primary Examiner*—Jenna L. Davis
*Attorney, Agent, or Firm*—Anderson Kill Olick & Oshinsky

[57] ABSTRACT

A sealing tape for wrapping up a cable, in particular a communication cable or the like, to be extended through a cable passageway opening, for forming a seal between the cable and the cable passageway opening, has on its inner surface facing the cable a roughened surface area that excludes axial and circumferential displacement of the sealing tape relative to the cable under influence of intervening axial and torsional loads, thereby insuring anti-skid placing of the cable in the cable passageway opening.

2 Claims, 2 Drawing Sheets

5,346,742

SEALING TAPE FOR WRAPPING UP A CABLE EXTENDING THROUGH A CABLE PASSAGEWAY OPENING

BACKGROUND OF THE INVENTION

The invention relates to a sealing tape for wrapping up a cable extending through a cable passageway opening, in particular, a communication cable or a similar round member, for forming a seal between the cable and the cable passageway opening.

The prior art discloses a multiplicity of cable coupling boxes for connecting and branching cables such as communication cables. These cable coupling boxes all includes a socket with inserts located at its front end. The cable passageway opening is defined by a plurality of sealing rings of different diameters which, as the seal inserts, are formed as split-in-half elements and are individually removable to accommodate passage of cables of different diameters. With such coupling boxes, the seal inserts and the sealing rings are usually made of plastic materials. If a cable is to be placed without possibility of skidding in axial and circumferential directions under influence of axial and torsional loads acting thereon, first, the sealing rings themselves should be placed in cable passageway recesses without skidding relative to each other. To this end, the cable passageway recesses and the sealing rings have inner radial stop notches for receiving respective stop lugs for preventing displacement of the sealing rings in axial and circumferential direction (see German Utility Model DE-GM 91 07 914). In addition, the cable itself should be placed in the cable passageway opening, which is formed by the sealing rings, without a possibility to skid under influence of intervening axial and torsional loads. In fact, a cable inserted through the sealing rings corresponding to the cable diameter, being wrapped up with a sealing tape that forms a seal between the cable and the cable passageway opening. However, a relative displacement between the wrapping tape and the cable under sufficient high axial and torsional loads is not excluded.

Accordingly, the main object of the invention is an improved sealing tape for wrapping up a cable extending through a cable passageway opening, in particular a communication cable or a similar round member, and which is characterized by an increased gripping capability and excludes any relative movement between the wrapped up sealing tape and the cable with these advantageous features being achieved by simple and functionally appropriate means.

SUMMARY OF THE INVENTION

This and other objects of the invention are achieved, according to the invention, by providing a sealing tape of which at least the inner surface facing the cable has a toughened surface area. According to the preferred embodiment of the invention, the roughened surface area is formed by protruding friction elements. As a result, the sealing tape is characterized by an increased gripping capability of the inner surface that faces the cable, and a sufficient friction connection is achieved not only between the cable and the sealing rings or the cable passageway opening but also, in particular, between the sealing tape and the cable. Thereby an anti-skid placing of the cable is insured, and relative movement between the sealing tape and the cable is prevented even under influence of elevated axial and torsional loads.

Other inventive features are as follows. Usually, as a sealing tape, an adhesive tape having at least one carrier layer and one adhesive layer is used. In this case, according to the invention, the friction elements are formed of fine grained corundum or emery material with the friction elements being imbedded in the adhesive layer. According to another embodiment of the invention, which is independent of the above-discussed embodiment, it is envisaged that friction teeth formed of a plastic or metal material are used as the friction elements. The friction teeth are anchored in the tape material. In this case, an especially high gripping capability, and consequently, anti-skid property is achieved. The friction teeth are preferably squeezed out of a thin sheet metal insert which is faultlessly anchored in the sealing tape. For example, the friction teeth can be squeezed out of the sheet metal insert from under the top layer of the sealing tape. Advantageously, the sheet metal insert is provided with openings and sheet metal panels encompassing the openings and from which the friction teeth extend. The portion of the sheet metal panels, which are free from the friction teeth and are located between adjacent openings, have branched land portions. The sheet metal insert does not impede wrapping up a respective cable, and moreover, the land portions insure a sufficient conformation of the sealing tape. This is especially the case when the openings and the sheet metal panels are alternatively arranged in rows transverse to the lengthwise direction of the tape, and the sheet metal panels are connected with each other with sheet metal strips separated by openings and extending in the lengthwise direction of the tape. The strips are formed by panel land portions located between the opening and extending transverse to the lengthwise direction of the sealing tape and, consequently transverse to the wrapping direction.

In accordance with still another embodiment of the invention, independent of previous embodiments, the friction elements are made of a flexible plastic foil and are likewise imbedded in the sealing tape. In this case, the friction elements can be formed as friction cones, friction points or similar friction projections formed on or extruded from the plastic foil. In any case, the sealing tape according to the invention is provided with a plastic foil integrated therein and has likewise a sufficient conformation, and can be faultlessly wrapped up about a cable in the same manner as conventional sealing tapes.

Finally, according to the invention, the friction elements, or the sheet metal insert, or the plastic foil are (is) provided only in the front wrap up region of the sealing tape and which has a length such that the front region at least ones wraps up the cable.

BRIEF DESCRIPTION OF THE DRAWINGS

The features and objects of the present invention will become more apparent and the invention itself will be best understood from the following detailed description of the preferred embodiment when read with reference to the accompanying drawings, wherein.

DETAILED DESCRIPTION OF THE PREFERRED EMBODIMENT OF THE INVENTION

Figure 1:
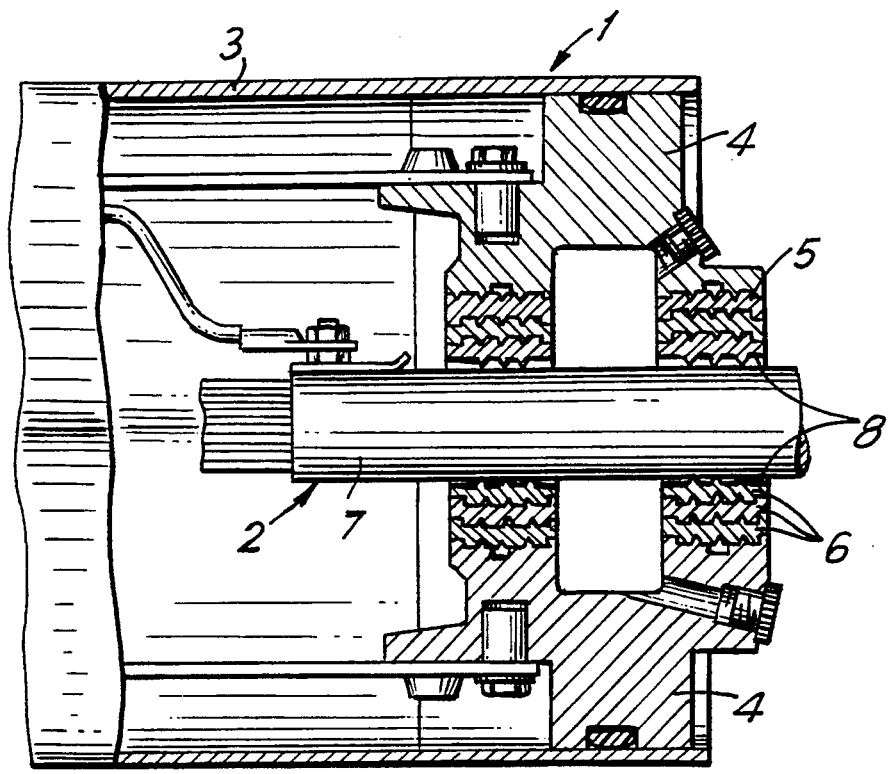
FIG. 1 shows a partial cross-sectional view of a cable coupling box with a cable, which is wrapped up with a sealing tape according to the invention, extending therethrough.
Figure 2:
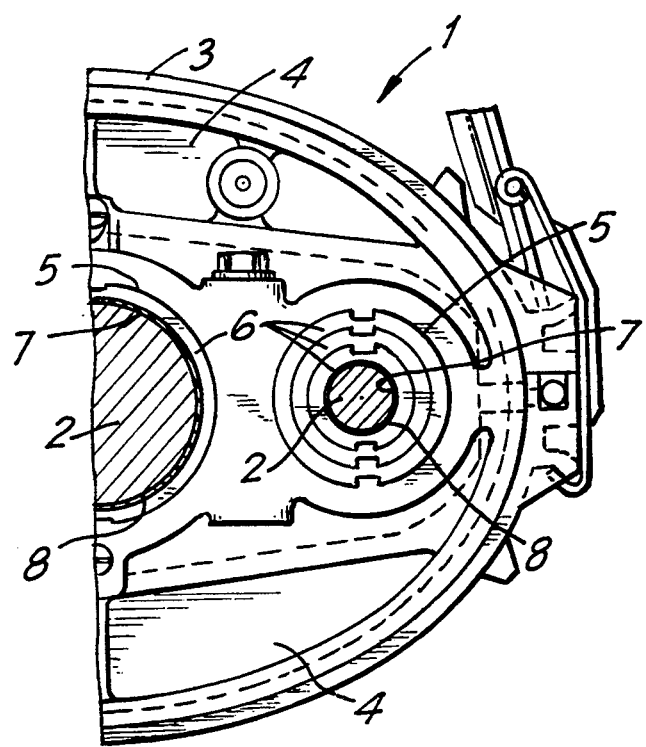
FIG. 2 shows a partial front elevational view of the assembly of FIG. 1.
Figures 3, 4:
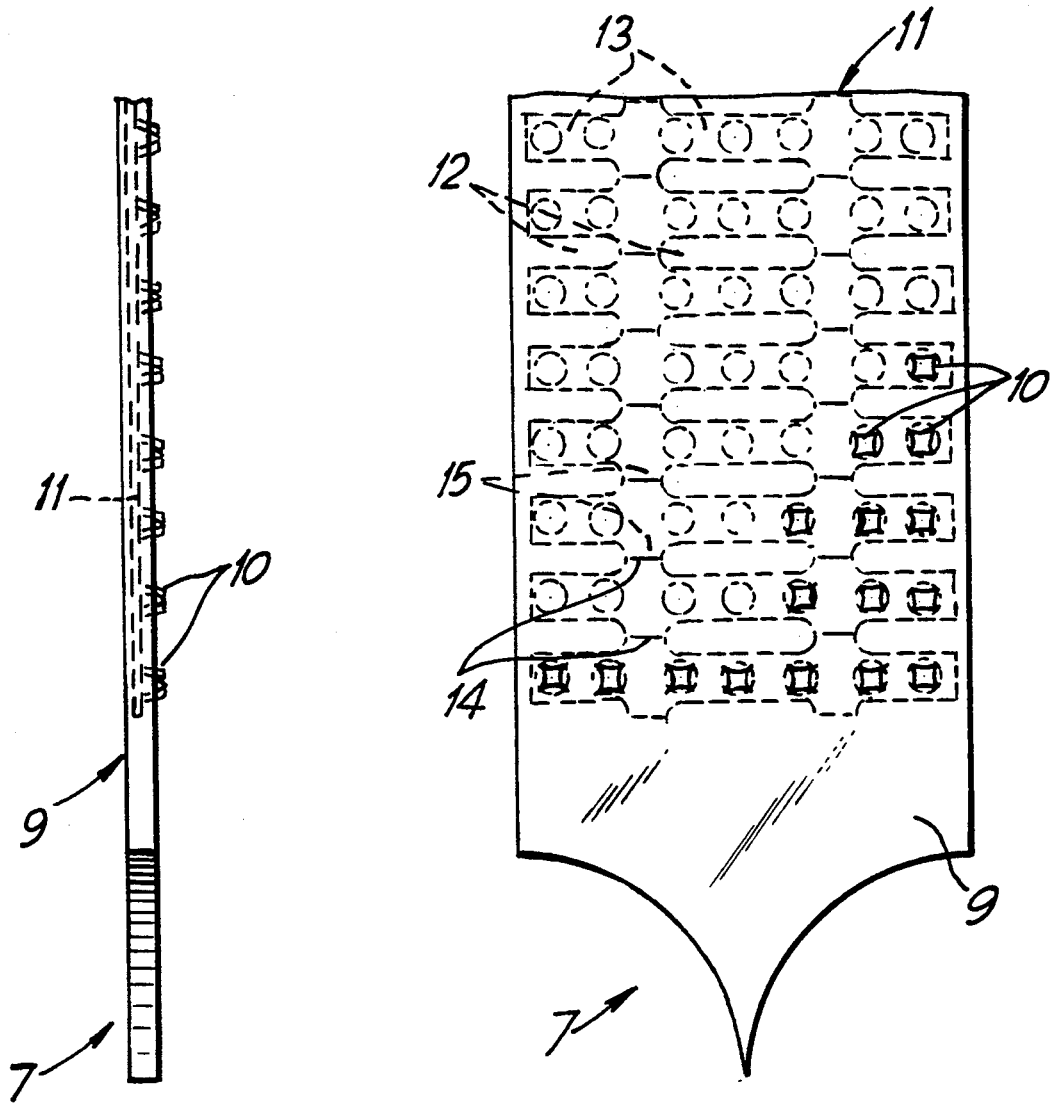
FIG. 3 shows a partial side view of the sealing tape according to the invention.
FIG. 4 shows a top view of the inner surface of the sealing tape of FIG. 3 facing the cable.

FIG. 1 shows a cable coupling box 1 for connecting and branching off a cable 2 which may be of different diameters. The coupling box 1 comprises a socket 3 and seal inserts 4 located at the front end of the socket 3 and provided with cable passageway recesses 5. The passageway recesses 5 are lined with sealing rings 6 of different diameters. The seal inserts 4 and the sealing rings 6 are formed as split-in-half elements. The sealing rings 6 are individually removable for accomodating cables of different diameters. The passageway recesses 5 and the sealing rings 6 have inside radial stop lugs, and the sealing rings 6 have, in addition, outer radial recesses for receiving the stop lugs of respective sealing rings to secure the sealing rings 6 against rotational and axial displacements relative to each other. The inner radial stop lugs and the outer radial recesses are not shown separately. Each cable 2 is wrapped up with a sealing tape 7 and is inserted into a cable passageway opening 8 corresponding to the cable diameter. The cable passageway opening 8 is formed by a respective plurality of sealing rings 6 which provides a seal between the cable 2 and the cable passageway opening 8. At least the inside surface of the sealing tape 7 facing the cable has a roughened surface area 9. The roughened surface area 9 is formed by protruding friction elements 10. In the disclosed embodiment, the friction elements 10 are formed as metal friction teeth anchored in the tape material. The friction teeth 10 are squeezed out from a thin sheet metal insert 11, actually, from the top portion thereof. The sheet metal insert 11 is provided with openings 12 and sheet metal panel 13 encompassing the openings 12. The friction teeth 10 project from these sheet metal panels 13. The portions of the sheet metal panels 13 free of the friction teeth 10, have land portions 14. In the discussed embodiment, the opening 12 and the sheet metal panels 13 are alternatively arranged in rows transverse to the lengthwise direction of the sealing tape 7 and, consequently, transverse to the wrapping direction. The sheet metal panels 13 are connected with sheet metal strips 15 which are separated from each other by openings 12 and are arranged in the tape lengthwise direction. The sheet metal strips 15 are formed by the land portions 14 which extend transverse to the tape lengthwise direction and, consequently, transverse to the wrapping direction. Thus, the sheet metal insert 11 does not adversely affect the cable 2 during wrap up.

It is sufficient to arrange the sheet metal insert 11 so that the friction elements 10 are located only in the front wrap up region of the sealing tape 7. The length of the front wrap up region should at least correspond to the cable perimeter. The friction elements 10 insure antiskid placing of the cable preventing relative movement between the cable and the sealing tape under usually occurring axial and torsional loads.

While particular embodiments of the invention have been shown and described, various modifications thereof will be apparent to those skilled in the art and, therefore, it is not intended that the invention be limited to the disclosed embodiments or to the details thereof, and departures may be made therefrom within the scope and the spirit of the invention as defined in the appended claims.

What is claimed is:

1. A sealing tape for wrapping up a cable to be extended through a cable passageway opening to form a seal between the cable and the cable passageway opening, said sealing tape comprising an inner surface facing the cable and having a roughened surface area, said roughened surface area being formed by friction elements protruding from said inner surface, and said friction elements being made as friction teeth which are made of a metal and are anchored in a sealing tape material, wherein said friction teeth are squeezed out from a sheet metal insert, and wherein said sheet metal insert includes openings and sheet metal panels encompassing said openings, said friction teeth protruding from said sheet metal panels, and said sheet metal panels having portions free of friction teeth and land portions extending from said free portions between adjacent openings.

2. A sealing tape as set forth in claim 1, wherein said openings and said sheet metal panels are arranged in rows transverse to a lengthwise direction of said sealing tape, said sealing tape further comprising sheet metal strips separated by said openings and extending in the lengthwise direction of said sealing tape for connecting said sheet metal panels, said sheet metal strips being formed by said land portions which extend transverse to the lengthwise direction of said sealing tape.

* * * * *